Jan. 1, 1929. 1,697,292
E. A. SPERRY
ENGINE AND THE TRANSMISSION OF POWER THEREFROM
Filed Dec. 17, 1919   3 Sheets-Sheet 1
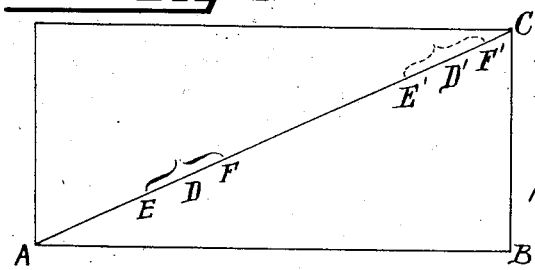
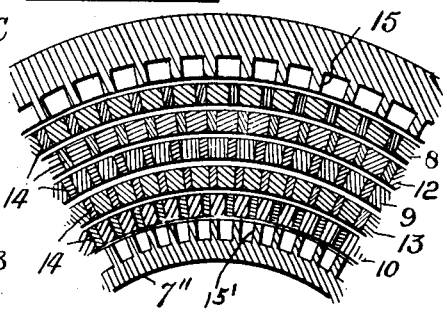
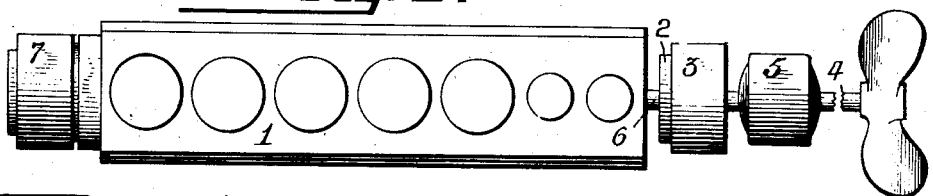
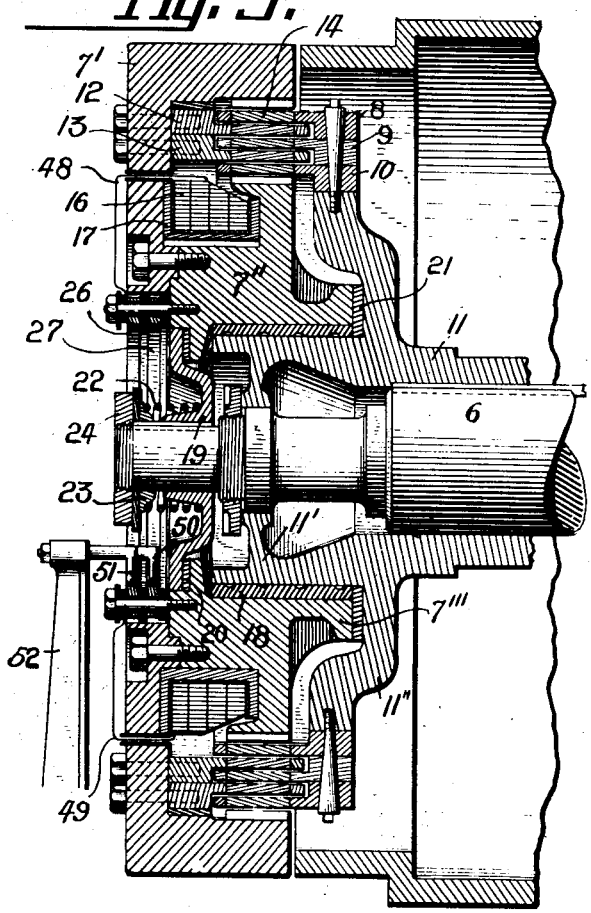
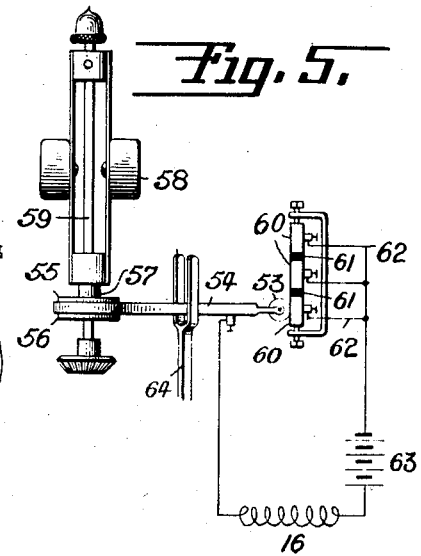
INVENTOR
ELMER A. SPERRY.
BY
Herbert H. Thompson
HIS ATTORNEY.

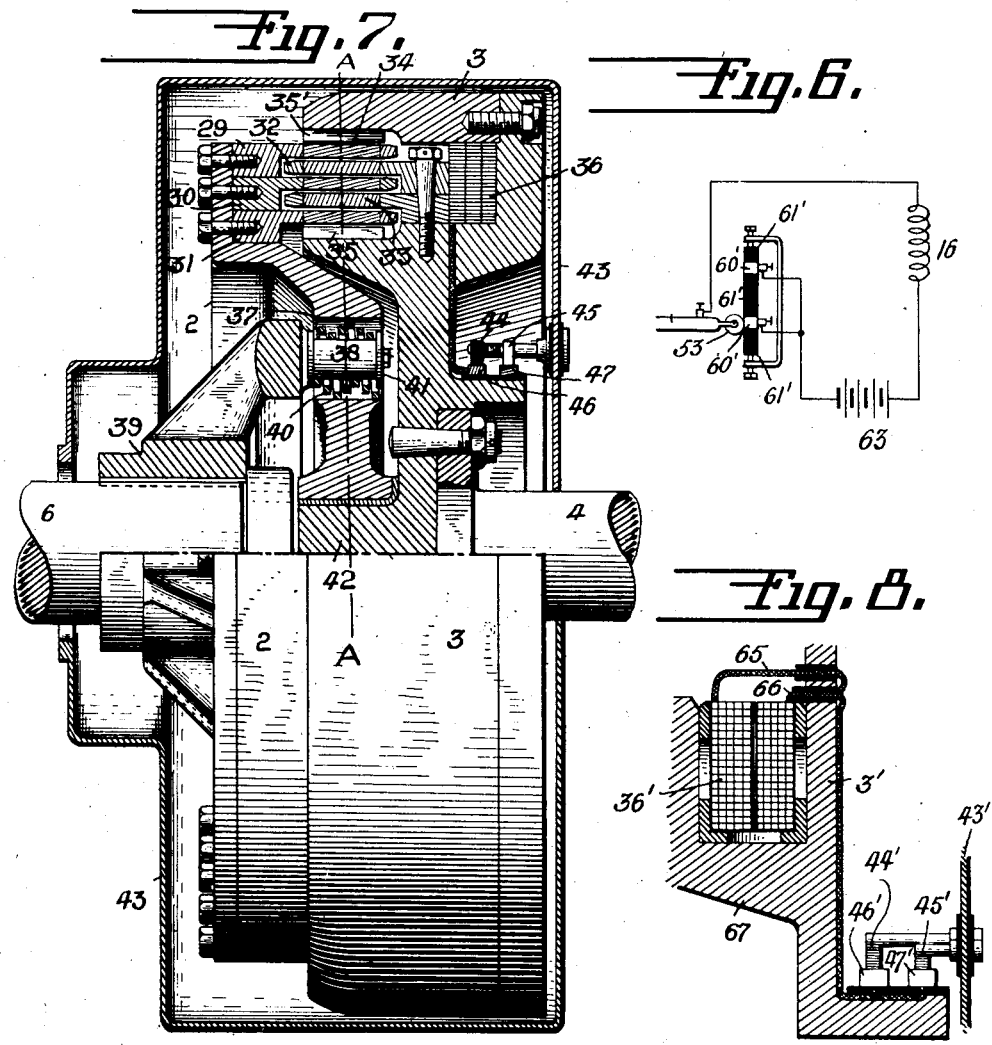

Jan. 1, 1929.  E. A. SPERRY  1,697,292
ENGINE AND THE TRANSMISSION OF POWER THEREFROM
Filed Dec. 17, 1919   3 Sheets-Sheet 3
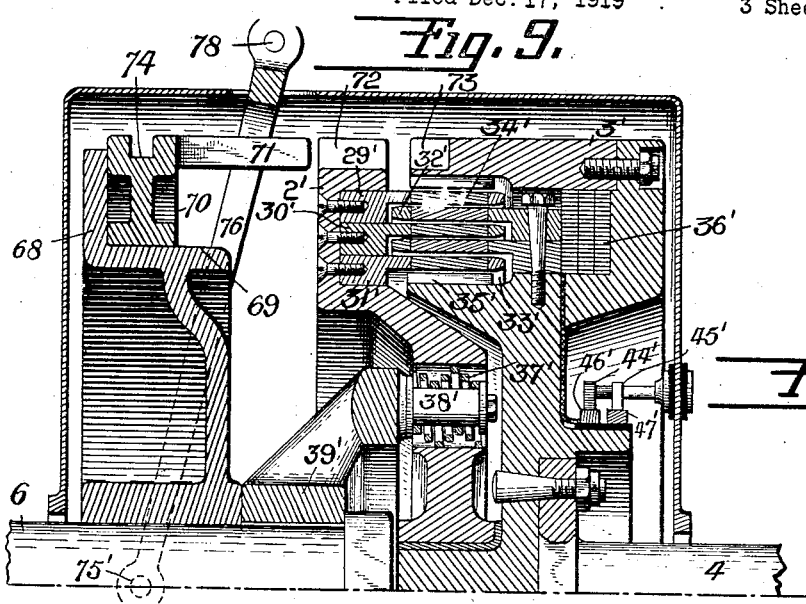
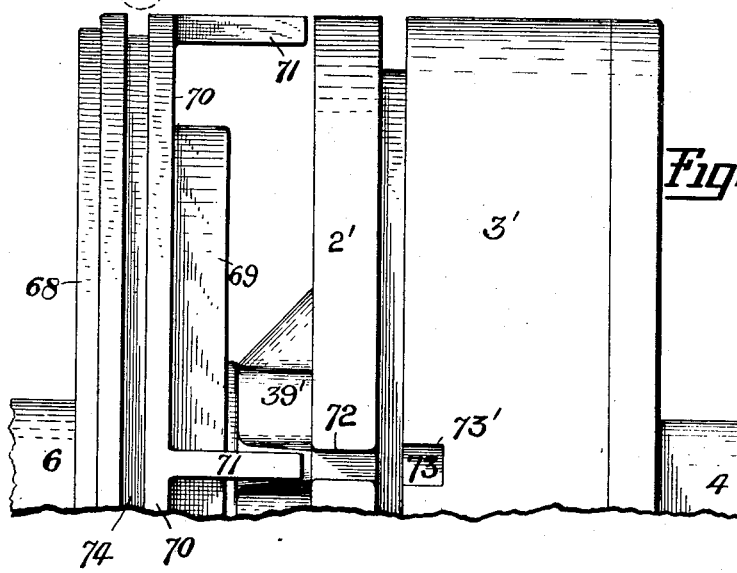
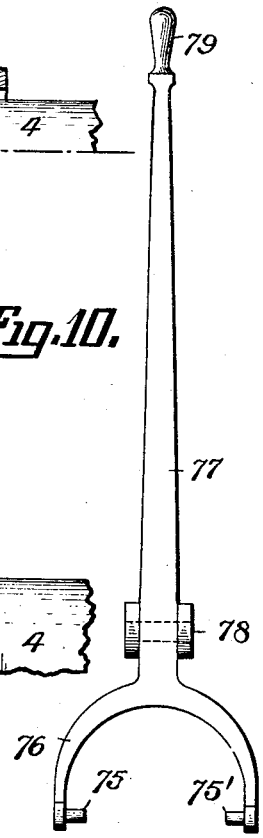
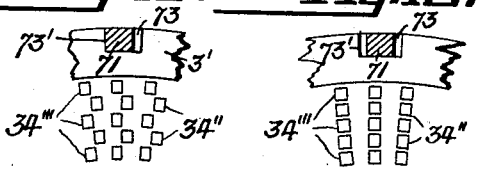
INVENTOR
ELMER A. SPERRY
BY
Herbert H. Thompson
HIS ATTORNEY.

Patented Jan. 1, 1929.

1,697,292

UNITED STATES PATENT OFFICE.

ELMER A. SPERRY, OF BROOKLYN, NEW YORK.

ENGINE AND THE TRANSMISSION OF POWER THEREFROM.

Application filed December 17, 1919. Serial No. 345,660.

This invention relates to improvements in engines or other sources of power and the transmission of power therefrom. As is well known, the crank shaft of every internal combustion engine has a natural period of torsional vibration, which is reached when said shaft of the engine attains a certain speed of rotation, hereinafter referred to as the critical speed. Particularly in the case of internal combustion engines of ten or twelve cylinders, such as are used in propelling certain types of ships and submarines, when this natural period is attained the entire structure on which the engine is mounted may be severely racked and shaken. Accordingly I have devised means for minimizing the vibrations of the engine. A further object of the invention is the provision of an improved, non-friction coupling in connection with such means. Another object of my invention is to provide an improved connection or clutching means between a driving member and a driven member which are not in exact alignment, whereby one member may be driven from the other and at the same time slight play between the two permitted.

Referring to the drawings, wherein I have shown what I now consider to be the preferred forms of my invention:

Fig. 1 is a diagram for illustrating the application of my invention.

Fig. 2 is a plan view showing the features of my invention in connection with an engine, a motor, and a propeller shaft of a submarine or other craft.

Fig. 3 is a longitudinal sectional view of means for changing the moment of inertia of the crank shaft of the engine.

Fig. 4 is an enlarged sectional view of parts shown in Fig. 3.

Fig. 5 is a diagrammatic view of one form of means for controlling the means shown in Fig. 3 in accordance with the engine speed.

Fig. 6 is a view of a modification of the means shown in Fig. 5.

Fig. 7 is a view, partly in longitudinal section, showing clutching means permitting relative play between a pair of shafts.

Fig. 8 is a view of a modification.

Fig. 9 is a longitudinal sectional view of the upper half of an alternative clutching arrangement.

Fig. 10 is a plan view of parts shown in Fig. 9.

Fig. 11 is a view of a detail.

Figs. 12 and 13 are diagrammatic views illustrating the operation of the clutching arrangement of Fig. 9.

In Fig. 1 let time be measured along line A B, and speeds of rotation of the crank shaft in revolutions per minute along line B C. Then line A C represents the normal variation of speed of the crank shaft in accordance with time as the engine is started until a certain speed is attained. As the critical speed, say 160 revolutions per minute, is approached, the natural period of torsional vibration of the crank shaft is reached and consequently rapid and violent torsional vibrations of said shaft occur until the limit of the range of speed corresponding to such natural period of vibration is passed. Let point D on line A C denote the aforesaid critical speed. If now, as said speed is approached the moment of inertia of the crank shaft be changed, at point E, for example, the critical speed is also changed and the speed of rotation of the crank shaft may pass through the aforesaid range of speed without the occurrence of the natural period of vibration of the crank shaft. The objectionable vibrations of the crank shaft may be thus prevented and the strain on the engine support considerably lessened. After the speed of rotation of the crank shaft has passed through the range E F the moment of inertia of the crank shaft is restored to its original value and the speed may be increased further without the natural period of vibration of the crank shaft occurring. If there should be more than one critical speed, such as D', the moment of inertia of the crank shaft should be again changed at points E' and F'.

In Fig. 2 I have shown an internal combustion engine 1 connected through my preferred form of electro-magnetic torque applying device 2, 3 with a propeller shaft 4. Said propeller shaft may be driven by a motor 5, as is common in submarines, after engine 1 has been unclutched therefrom. For changing the moment of inertia of the crank shaft 6 of the engine 1, a flywheel 7 is adapted to be clutched to and unclutched from said shaft.

While various means may be provided for clutching shaft 6 and flywheel 7 together I prefer to provide an electro-magnetic torque applying device, which, for the purposes of this disclosure may be briefly termed a "clutch", comprising a series of annular members of non-magnetic material having inserts of steel or other magnetic material. In Figs. 3 and 4 it will be seen that three of these rings 8, 9, and 10 are shown secured to member 11 keyed or otherwise secured to shaft 6 to rotate therewith. Two similar rings 12 and 13 are secured to section 7' of flywheel 7, so that ring 8 surrounds ring 12, ring 12 surrounds ring 9, ring 9 surrounds ring 13, and ring 13 surrounds ring 10. Each of these annular members is provided with steel or iron inserts 14 which may extend in a direction parallel to the axis of the shaft 6 and flywheel 7 and are preferably equidistantly spaced in a circumferential direction. To increase the torque of the device the periphery of flywheel 7 which surrounds ring 8 may be grooved to provide teeth 15 which correspond to the steel inserts in any one of the annular members both in spacing and in number. Likewise, the periphery of section 7'' of flywheel 7 which is surrounded by ring 10 may be similarly grooved and provided with teeth 15'. While various means may be provided for passing magnetic flux through the members, I prefer to provide a magnetizing coil 16 mounted on a ring 17 of non-magnetic material secured between sections 7' and 7'' of the flywheel as shown. With the arrangement shown it will be readily seen that when coil 16 is energized, magnetic flux will pass through section 7', teeth 15, the magnetic inserts 14, teeth 15' and section 7'' thus tending to align the inserts in the corresponding rings. Movement of the set of rings on member 11 when coil 16 is energized, will thus cause corresponding movement of the other set together with flywheel 7. As shown, flywheel 7 may comprise two sections 7' and 7'' secured together and rotatably mounted on an axial extension 11' of member 11. If desired a lining of bearing metal 18, such as Babbitt or bronze, may be interposed between sections 7'' and 11' as is customary in bearings. Preferably there should be sufficient friction between flywheel 7 and member 11 to cause the flywheel to be dragged along with the shaft 6, though at a lesser speed of rotation, for a purpose to be mentioned later. As it may be desirable to vary this amount of friction means for adjusting the friction are preferably provided. One form of such means is illustrated in Fig. 3 and may be constructed substantially as follows.

Adjacent section 7'' of flywheel 7 is a member 19 slidably connected to shaft 6 for rotation therewith. Preferably a suitable metal lining 20 is interposed between adjacent flanges on members 19 and 7'' and a similar lining 21 may be placed between extension 7''' of section 7'' and extension 11'' of member 11. A spring 22, mounted between members 19 and 23, the latter being likewise rotatable with shaft 6 and slidable thereon, serves to force the end of extension 7''' of flywheel 7 against lining 21 and portion 11'' of member 11. To vary the action of the spring, the end of shaft 6 may be threaded and a nut 24 mounted thereon. Obviously as nut 24 is turned in one direction or the other the tension of spring 22 is varied and the friction between flywheel 7 and member 11 regulated.

To supply current to magnetizing coil 16 I have shown a pair of collector rings 26 and 27 insulated from each other and from flywheel 7, to which they are bolted as shown. Conductors 48 and 49 from coil 16 pass through holes provided in flywheel 7 for connection with rings 26 and 27, one conductor being connected with ring 26 and the other with ring 27. Brushes 50 and 51 engage rings 26 and 27 respectively for supplying current thereto, said brushes being mounted on a suitable stationary support 52.

In Fig. 5 I have shown one form of means for making and breaking a circuit through coil 16 in response to the speed of rotation of the crank shaft. A roller 53 is carried by an arm 54 engaged between two flanges 55, 56 on a depending sleeve 57 of a governor 58, the shaft 59 of which governor may be rotated in any suitable manner by the engine 1. It is evident that either of two methods may be employed for effecting the purposes of the invention. Either the flywheel 7 may be normally coupled to shaft 6 and uncoupled as the critical speed is passed through or it may be normally uncoupled and only coupled to the shaft as such critical speed is passed through. If it should be desired to unclutch the flywheel from the crank shaft as the critical speed is approached and to clutch the flywheel and shaft together after said speed has been passed, the arrangement of contacts 60 and strips of insulation 61, as shown in Fig. 5, may be provided. Said contacts 60 are adapted to be engaged by roller 53 and are connected by conductors 62 with one pole of a source of E. M. F. 63. To the other pole of said source are connected coil 16 and roller 53. It will thus be seen that, when roller 53 is in engagement with one of contacts 60, coil 16 will be energized and magnetic flux will be passed through the members of the torque applying device to couple flywheel 7 to shaft 6, so that both flywheel and shaft rotate with the same speed. When, however, the critical speed is approached, roller 53 engages one of the strips of insulation 61, whereupon the circuit through coil 16 is broken and flywheel 7 is unclutched from shaft 6. The moment of inertia of the crank shaft 6 is thus changed and the critical speed also changed. The natural period of vibration of the crank shaft thus does not occur at the speed at which it would have occurred had the said moment of inertia not been changed, and the speed of rotation of the crank shaft passes through the range E F of Fig. 1 without the occurrence of said period of vibration. As a speed corresponding to point F is reached, roller 53 comes into contact with the next contact segment 60, whereupon the flywheel 7 is again clutched to shaft 6 and the original critical speed restored. However, the speed of shaft 6 has been increased sufficiently to have passed said critical speed. As many strips of insulation 61 should be provided as there are critical speeds. Thus in Fig. 5 two such strips are shown, corresponding with critical speeds D and D' of Fig. 1. A relatively stationary guideway 64 is shown for preventing lateral displacement of arm 54 and roller 53.

If it is desired to increase the moment of inertia of the shaft 6 as the critical speed is approached, the arrangement of contacts 60' and insulation 61' shown in Fig. 6 may be substituted for the arrangement of contacts 60 and 61 of Fig. 5. When the speed of rotation of shaft 6 corresponds to point E in Fig. 1, roller 53 passes from a strip of insulation 61' on to a contact segment 60', thereby closing a circuit through coil 16 and clutching flywheel 7 to shaft 6. Preferably there should be sufficient friction between the flywheel and shaft so that when the flywheel is unclutched from the shaft it will rotate with it at almost the same speed, thereby enabling the torque applying device to take hold and prevent any appreciable decrease of speed of shaft 6 when said flywheel is clutched thereto. Means for providing suitable friction between the flywheel and shaft have already been described. By clutching said flywheel and shaft together, the moment of inertia and consequently the critical speed of the shaft are changed so that the speed of said shaft can pass safely through the original critical speed without the natural period of vibration of the engine occurring. Upon reaching a speed corresponding to point F, roller 53 passes into engagement with the next strip of insulation 61', thus breaking the circuit through coil 16 and uncoupling the flywheel 7 from crank shaft 6.

It will thus be seen that I have provided means for preventing objectionable vibrations of the engine from occurring by changing the moment of inertia of the crank shaft as the critical speed is approached, thereby changing the critical speed, and then, after the speed of the crank shaft exceeds the original critical speed by a sufficient amount, restoring the moment of inertia of the crank shaft to its original value. Consequently at no time during the rotation of the crank shaft does said crank shaft vibrate in accordance with its natural period of vibration. The objectionable vibrations of the engine are thus prevented, and the total number of its vibrations minimized.

Of course, if desired, the circuit through magnetizing coil 16 could be made and broken manually in accordance with the speed of the crank shaft as read from a suitable indicator.

Another feature of my invention consists of an improved connection between tail-shaft 4 and engine shaft 6. In Fig. 7, crank shaft 6 is shown connected with an element 2 of an electromagnetic torque applying device adapted to cooperate with a complementary element 3 connected with propeller shaft 4. Elements 2 and 3 comprise a plurality of annular members 29, 30, and 31 of non-magnetic material secured to element 2 and cooperating with similar members 32 and 33 secured to element 3, said members being each provided with inserts 34 of magnetic material. The element 3 is provided with grooves 35 and 35' on its inner peripheral portions, as shown, to provide teeth corresponding with inserts 34. A magnetizing coil 36 is provided for passing magnetic flux through said annular members. The operation of the clutching means between shafts 4 and 6 is thus similar to that between shaft 6 and flywheel 7, and shafts 4 and 6 are clutched together whenever current is passed through coil 36. In this connection, moreover, it should be noted that the electromagnetic torque applying device described forms practically a non-slip connection between the driving and driven members but at the same time permits slight play between said members with relation to their axis of rotation since spaces are provided between adjacent rings of the torque applying device. Preferably I provide additional means for permitting further play between shafts 4 and 6 for a purpose now to be described.

In practice it is found that shafts 4 and 6 are often forced out of alignment on starting of the ship and to provide for the driving of one shaft by the other through the clutch under such conditions I have shown one clutch element universally and yieldingly connected to its respective shaft. One form of such connection may comprise a plurality of apertures in one element of the torque applying device receiving corresponding projections on one of the shafts, said projections being yieldingly connected to said element. Such a type of connection is shown in Fig. 7, wherein element 2 is provided with a suitable number of apertures, one of which is shown at 37. Projections from hub 39 keyed to shaft 6 are received in the apertures above referred to, one of said projections being indicated at 38. Any suitable type of yielding connection may be provided between each projection and element 2, for example, such as shown in Fig. 7, in the form of a spring 40 cooperating with a flange 41 on projection 38 and having its coils wound about different centers so as to tend to restore shaft 6 to exact alignment with shaft 4 whenever shaft 6 tilts in any direction out of such alignment. Element 2 is shown rotatably mounted on a hub 42 of element 3. A casing 43 encloses the elements 2 and 3 and carries brushes 44 and 45 which engage with annular contacts 46, 47 to which may be connected suitable conductors for conveying current to coil 36. It should be noted, in this connection, that the flexible connection 38—40 between shaft 6 and element 2 is in the same transverse plane as the magnetic inserts 34. In other words, said connection and certain of said inserts are in substantially a radial line with respect to shafts 4 and 6, as is indicated by dotted line A—A in Fig. 7.

In Fig. 8 is shown a modified arrangement of connections between the magnetizing coil and the collector rings, applicable to either of the constructions of Figs. 3 and 7. Magnetizing coil 36' is shown so wound that both ends of 65, 66 of the coil may lie adjacent each other when passed through element 67, which element corresponds to element 3 in Fig. 7 or to fly wheel 7 of Fig. 3. The conductors 65, 66 are then passed along the outer face of element 3' and connected with collector rings 46', 47' respectively, the latter being engaged by the usual brushes 44' and 45'.

If desired, means may be provided for clutching shafts 4 and 6 together in case the current through the magnetizing coil should fail or whenever it may be desired not to use the electromagnetic torque applying device. One form of such means I have shown in Figs. 9 and 10 in which figures the elements of the electromagnetic torque applying device are similar to those shown in Fig. 7. Parts of the electromagnetic torque applying device of Fig. 9 corresponding to those of Fig. 7 are designated by corresponding numerals with a prime added.

Surrounding shaft 6 and adjacent member 39' is a member 68 preferably rotatable with shaft 6, and provided with a seat 69 at its periphery for a slidable disc 70. The latter carries teeth 71, extending through recesses 72 in the periphery of member 2'. In the periphery of member 3' corresponding recesses 73 are provided. If now the magnetic torque applying device should become inoperative, as by the failure of current in coil 36', shaft 4 can be driven from engine shaft 6 if disc 70 be moved to bring teeth 71 into recesses 73.

For moving disc 70 into and out of position for enabling shaft 4 to be driven from shaft 6 various means may be employed. By way of illustration I have shown a groove 74 in the periphery of disc 70 with which groove pins 75, 75' on forked end 76 of lever 77 are adapted to engage in the well known manner. Said lever 77 is pivoted at 78 so that, when handle 79 is moved in either direction disc 70 will be moved correspondingly. In Fig. 11 lever 77 is shown on a smaller scale than in Fig. 9.

If desired sufficient lost motion may be provided between teeth 71 and the walls of recesses 73 that, when coil 36' is energized, element 3' and shaft 4 may be driven through the electromagnetic torque applying device from shaft 6, without withdrawing teeth 71 from recesses 73. Thus, assume shaft 6 to be turning in a direction to cause tooth 71 to engage wall 73' of recess 73 to drive shaft 4. If, under these conditions, the magnetic inserts 34' connected with the shaft 6 are out of alignment by the proper amount with the inserts connected with shaft 4 upon the alignment of said inserts when coil 36' is energized member 3' will be moved sufficiently with respect to member 2' that wall 73' will no longer be engaged by tooth 71 and shaft 4 will be driven entirely through the medium of the electromagnetic torque applying device. Regardless of the direction of rotation of shaft 6, if the lost motion between teeth 71 and the walls of recesses 73 be sufficient and if the magnetic inserts connected with shaft 6 be out of alignment by the proper amount with those connected with shaft 4 when teeth 71 are driving, shaft 4 may be driven from shaft 6 by the electromagnetic torque applying device alone without withdrawing teeth 71 from recesses 73. This is shown diagrammatically in Figs. 12 and 13.

In Fig. 12 tooth 71 is shown in engagement with a wall of slot 73, while magnetic inserts 34'' connected with element 3' and shaft 4 are out of alignment as shown with respect to inserts 34''' connected with element 2' and shaft 6. Tooth 71 thus serves to drive shaft 4. Upon energization of coil 36', however, inserts 34'' and 34''' are moved more into alignment as shown in Fig. 13 and shaft 4 is driven through the electromagnetic torque applying device, tooth 71 no longer being in driving engagement with recess 73.

This construction may also possess the advantage of assisting and preventing breaking of the magnetic coupling or lock by a sudden jerk or overload. In such case if the mechanical teeth 73' were in they would be brought against the walls of the slots 73 when the magnetic teeth were relatively displaced, as shown in Fig. 12, thereby assisting in driving the load until the magnetic torque applying device was strong enough to again assume the entire drive as described.

In accordance with the patent statutes, I have herein described the principle of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a clutching means for shafts, an electromagnetic torque applying non-slip device of two parts, and auxiliary mechanical means adapted to be brought into action by slippage beyond a predetermined amount between said parts to supplement the magnetic drive.

2. In combination, a rotatable member provided with a portion C-shaped in cross section and of magnetic material, a magnetizing element carried by said portion, isolated magnetic elements within the gap of said C-shaped portion, and means for securing said magnetic elements to said member.

3. In combination, a rotatable member provided at its rim with a portion C-shaped in cross section and of magnetic material, a magnetizing element carried by said portion, isolated magnetic elements within the gap of said C-shaped portion, and means for securing said magnetic elements to said member.

4. In combination, a rotatable member provided with a portion C-shaped in cross section and of magnetic material, a magnetizing element carried by said portion, a member of non-magnetic material secured to said rotatable member within the gap of said C-shaped portion, and magnetic elements supported by said member of non-magnetic material.

5. In combination, a rotatable member provided with a portion C-shaped in cross section and of magnetic material, a magnetizing element carried by said portion, a member of non-magnetic material secured within the gap of said portion, and a plurality of magnetic inserts carried by said member of non-magnetic material and longitudinally and circumferentially surrounded thereby.

6. In combination, a rotatable member provided with a portion C-shaped in cross section and of magnetic material, a magnetizing element carried by said portion, isolated magnetic elements within the gap of said C-shaped portion and connected with said member, a second rotatable member, and other magnetic elements within said gap and connected with said second rotatable member.

7. In combination, a rotatable member provided with a portion C-shaped in cross section and of magnetic material, a magnetizing element carried by said portion, a plurality of concentric sets of isolated magnetic elements within the gap of said C-shaped portion, means for securing part of said sets to said member, a second rotatable member, and means for securing the remainder of said sets to said second rotatable member.

8. In a magnetic torque applying device, a rotatable member having a portion C-shaped in cross section and of magnetic material, magnetizing means carried by said portion, a plurality of concentric sets of isolated magnetic elements within the gap of said C-shaped portion, and means for securing said sets to said member.

9. In combination, a driving element, a driven element, a magnetic clutch member connected to one element, a plurality of non-contacting spaced rings projecting from each member, the rings on one member fitting between the rings on the other member, a plurality of magnetic inserts carried by each ring, one member being rotatably supported on the other member, and means for flexibly connecting said former member with the other of said elements for the purpose specified.

10. In combination, a driving element, a driven element, a magnetic torque transmitting device having a part connected with one of said elements, a second part, a bearing rotatably supporting said second part on the first mentioned part, and resilient means connecting said second part with the other of said elements, said device, bearing and resilient means being in substantially radial alignment.

11. In combination, a first rotatable element, a second rotatable element having a portion C-shaped in cross section, spaced magnetic masses carried by said second element and located in the gap of said C-shaped portion, spaced magnetic teeth carried by said second element and corresponding in spacing and number with said masses, and other spaced magnetic masses in said gap and carried by said first rotatable element.

12. In combination, a rotatable element having a portion C-shaped in cross section, a plurality of isolated magnetic masses carried by said element within the gap of said C-shaped portion, and spaced magnetic teeth carried by said element within said gap.

13. In combination, a driving member, a driven member, non-mechanical clutching means comprising a pair of spaced magnetic elements interposed between said members, one of said elements having means forming a bearing for the other of said elements, and a flexible connection between one of said members and said clutching means, said connection, said elements and said bearing being in the same plane.

In testimony whereof I have affixed my signature.

ELMER A. SPERRY.